Jan. 31, 1939.                K. D. LOOSE                2,145,550
                         DOUGH SHEET MANUFACTURE
                           Filed June 5, 1936            3 Sheets-Sheet 1
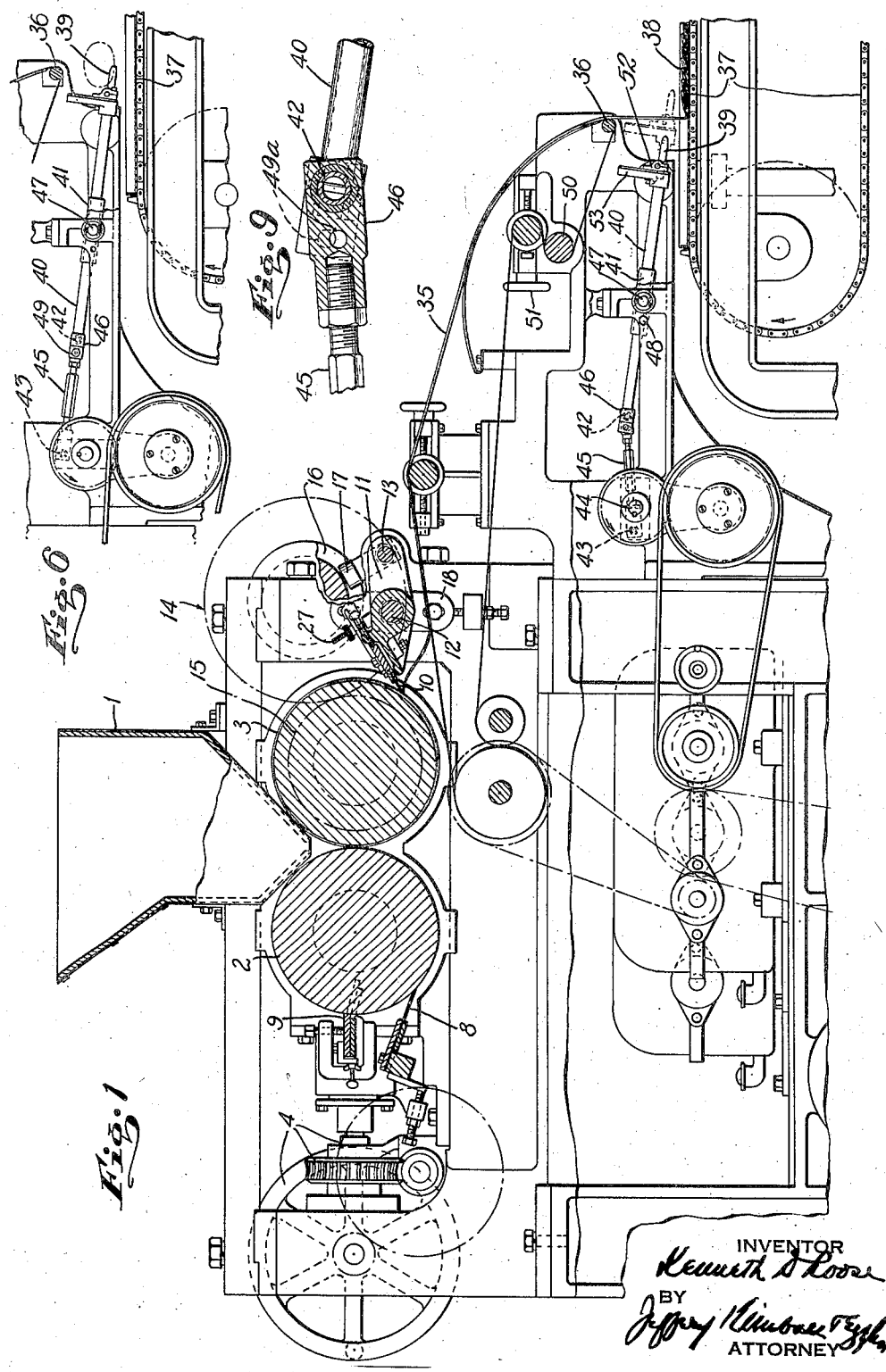

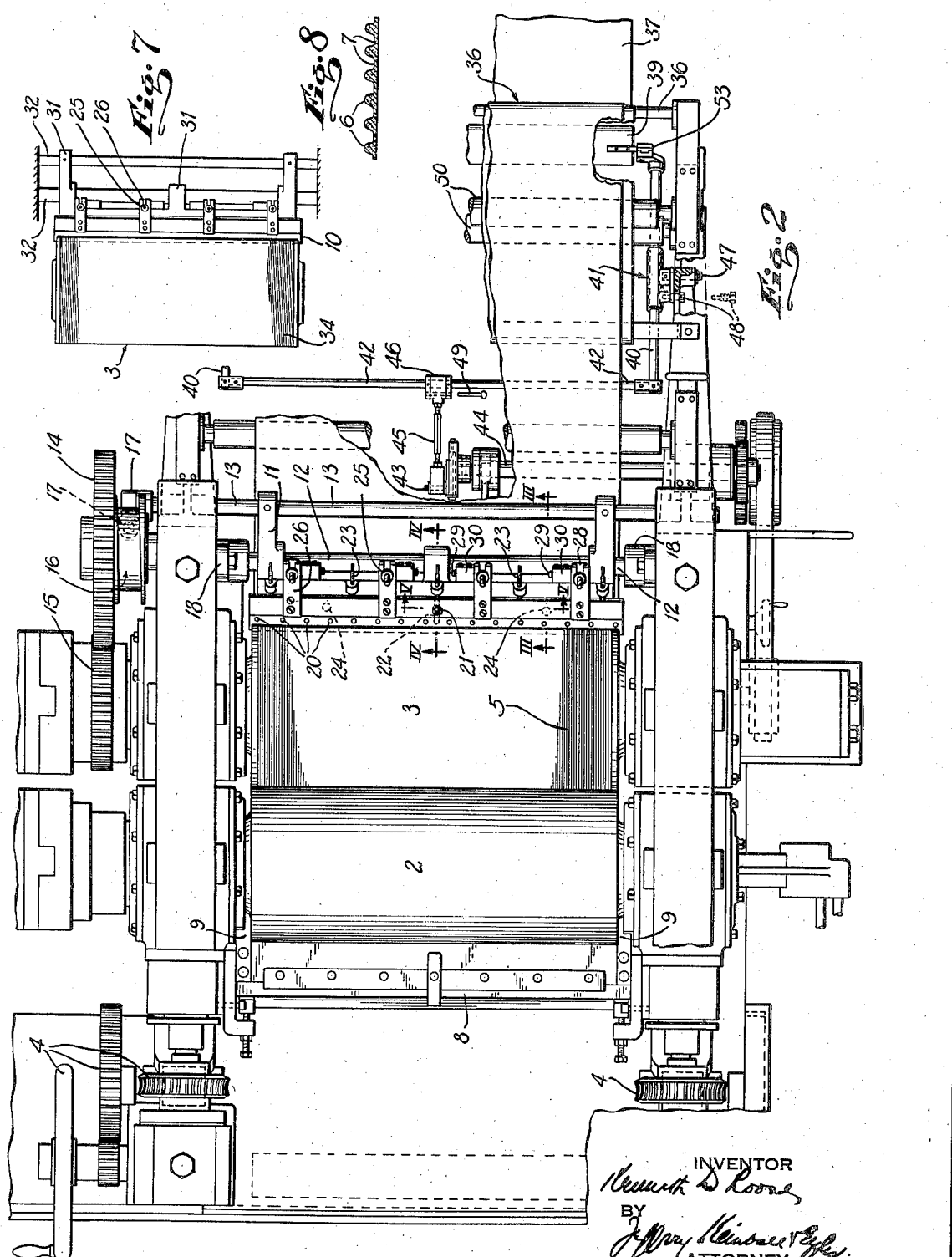

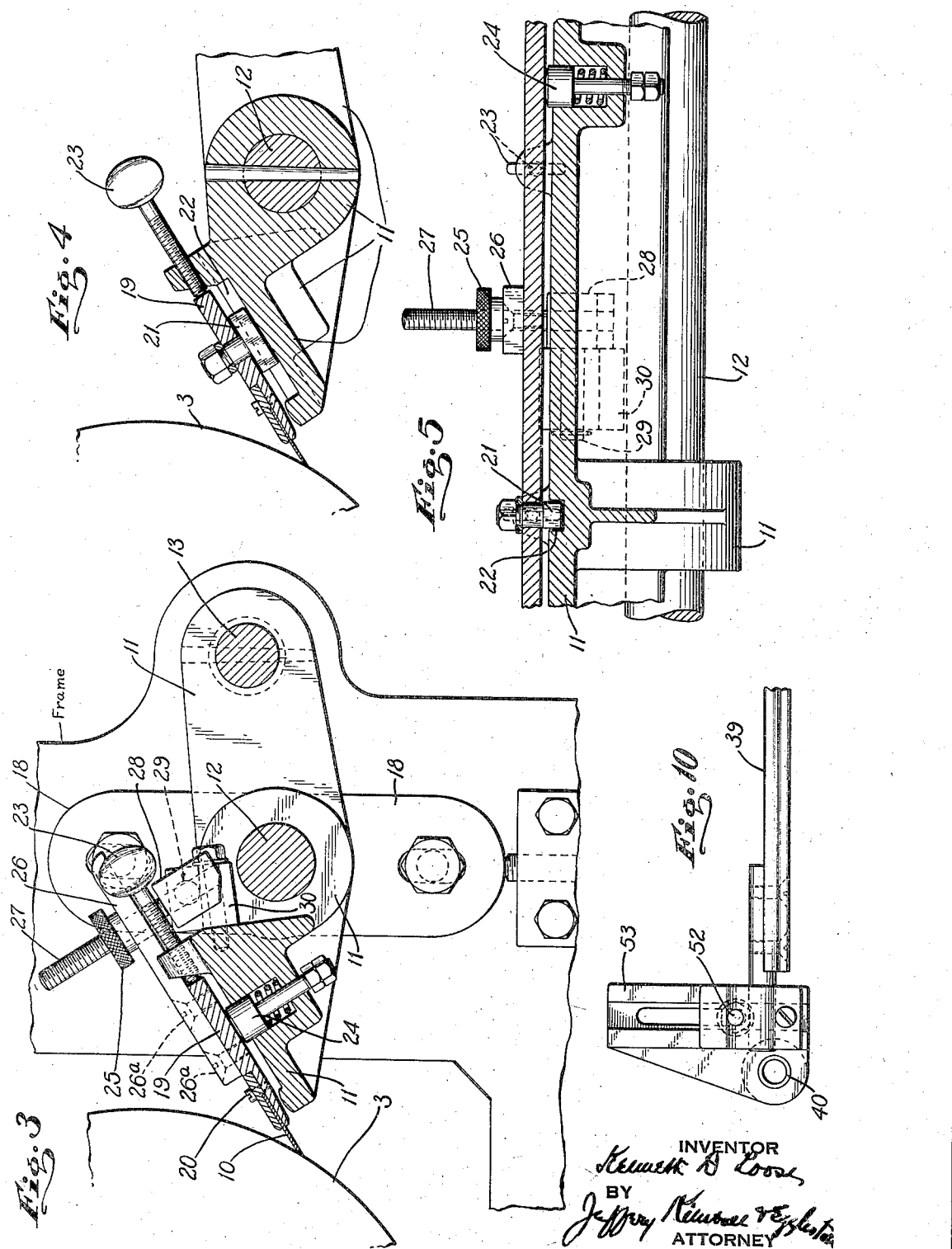

Patented Jan. 31, 1939

2,145,550

UNITED STATES PATENT OFFICE 2,145,550

DOUGH SHEET MANUFACTURE

Kenneth D. Loose, Bronxville, N. Y., assignor to Loose-Wiles Biscuit Company, Long Island City, N. Y., a corporation of New York Application June 5, 1936, Serial No. 83,611

10 Claims. (Cl. 107—2)

The invention relates to the manufacture of cereal or like food products of the kind formed of thin dough-sheet folded, or otherwise fabricated to form laminous biscuits or like articles possessing a high degree of tenderness because of the extreme thinness of the sheet. More particularly the invention relates to apparatus for making and manipulating the thin dough-sheet in preparation for its final manufacture at commercial production rates notwithstanding its tenuous character. As an example of the kind of product contemplated, the class of articles which is the subject of Patent No. 2,008,024, of July 16, 1935, may be referred to, although the product sheet can be utilized in other and various ways.

In the drawings, Fig. 1 is an elevation of a machine exemplifying the principles of the invention, shown partly broken out, Fig. 2 is a plan view, likewise partly broken out, Figs. 3–5 are enlarged detail views, on lines III—III, IV—IV and V—V respectively of Fig. 2;

Figs. 6 and 7 illustrate modifications;

Fig. 8 indicates, in section and much enlarged, the general form of the dough sheet;

Figs. 9 and 10 are details later referred to.

The reference 1 identifies a hopper for the material to be reduced, which may be a mass of mixed dough or cereal such as wheat berries previously cleaned, steamed or boiled and surface dried. Below the hopper are two power-driven rolls 2 and 3, which receive the cereal from the lower end of the hopper and extrude or deliver it as a thin dough-sheet. Roll 3 may be journalled in fixed bearings in the machine frame and roll 2 in bearings adjustable on the main framing to enable such roll to be brought into proper close and parallel relation to roll 3. The roll adjustment mechanism, marked 4, is not directly concerned with this invention and may be of any appropriate micrometric design adequate to withstand the pressures involved which are of high order.

One of the rolls, preferably the roll 3, is finely grooved, with many fine, circumferential grooves designated 5 (Fig. 2). The dimensions and spacing of these grooves are subject to variation according to the special characteristics desired for the product, but they are in any event fine grooves of the general order of about .020 inch in width and about .022 inch deep and spaced apart a distance more or less equal to their width. The other roll may be plain surfaced and when the two are in proper close relation the resulting dough-sheet is an extremely thin sheet made up of fine ribs conforming to the fine roll grooving united by intervening webs, so thin as to be translucent or diaphanous. The general cross-section of the sheet is shown in exaggerated scale in Fig. 8, the ribs being marked 6 and the intervening webs 7.

Such a dough-sheet, which is extremely fragile, adheres to the grooved roll. Roll 2 is kept clean and free of occasional dough particles likely to impair the integrity of the thin sheet by means of a doctor blade 8 and an additional wiper 9. According to this invention the ribbed dough-sheet is deflected or removed from the grooved roll 3 by means of a blade 10 having a straight knife edge by which it engages the surface of the roll or more exactly, the lands intermediate of the grooves cut therein. I have found that such a blade riding on the lands of the grooved roll is particularly efficient in removing the fragile dough-sheet, notwithstanding that the dough has been firmly pressed into the grooves. Such a blade permits the manufacture of sheets thinner and faster than would otherwise be possible and it is important to guard against any wearing of the blade tending to impair the straightness of its edge. The tendency is for the blade to wear into the grooves and become a comb with its teeth matching the grooves. Prevention of this effect can be accomplished by frequent blade renewal; it can also be accomplished automatically by causing a continuous relative movement to occur between the blade and the lands of the grooved roll surface, crosswise of the lands, so that the edge of the blade is subjected to substantially uniform wear throughout its length rather than localized wear at separate points. Such relative movement can be accomplished in different ways and as shown in Figs. 1 and 2, it is done by endwise reciprocation of the blade, produced as follows:

The knife or blade 10 is supported on a carriage which includes a carriage body 11 appropriately fastened to two cross-shafts 12 and 13 slidably mounted in the machine framing and reciprocated back and forth, with a short stroke, by the action of a gear 14 driven by a gear 15 on the roll shaft. This gear 14 carries a cam 16, of which the cam follower 17 is fast on the end of the cross shaft 13, so that the blade carriage reciprocates as the roll rotates. One or both of the cross-shafts may be adjustable on the frame and the shaft 12 is so shown, being fitted in sockets 18, slot-bolted to the machine framing.

The deflector blade 10 is immediately mounted in a blade holder 19, (Fig. 3) being clamped thereon by the series of screws 20, and such holder is mounted on the carriage with freedom for a certain limited movement with respect to it. It is held against longitudinal movement on the carriage in any appropriate way, as by means of the head 21 of a bolt (Fig. 4) bolted to it and fitting a slot 22 in the carriage body, and it is prevented from backing away from the roll by a series of adjustable thumb screws 23. It directly rests on a series of spring-yielding buttons 24 (Fig. 3) housed in the carriage body, being held against such buttons by a series of knurled thumb nuts 25 acting on the blade holder fingers 26. These fingers are fastened to the holder by screws 26ª (Fig. 3) but could be integral with it. The bolts 27 of these nuts have their heads 28 pivoted at 29 to the carriage body or to a block 30 bolted thereto. Tightening of the nuts rocks the blade holder on the buttons, which form a yielding fulcrum for it, and thereby the blade edge is pressed against the grooved roll, the springs of the buttons automatically taking up wear as it occurs and maintaining the close contact.

Thus the blade is reciprocated relatively to the roll grooves by the reciprocation of its otherwise rigidly mounted carriage and the blade itself is adjustable relatively to the rigid carriage, both in its own plane and transversely to such plane, the latter being a spring-pressure adjustment.

Instead of thus reciprocating the blade carriage as a means of maintaining a proper blade edge, substantially the same effect can be produced by making the blade-carriage stationary and cutting the grooves on the roll 3 in the form of a helix or helices, in which event the formation of comb-teeth by wear of the blade will obviously be prevented. This is shown in Fig. 7 wherein the blade 10 in the same kind of blade holder, is carried on a fixed mounting 31 quite like the carriage above referred to except that its two cross-shafts 32 and 33, corresponding to the shafts 12 and 13 are here fixed to the framing and do not reciprocate. The helical groove is indicated, diagrammatically at 34. Instead of a helical groove, circular grooves, if more wavy or with a circumferential direction that is mainly oblique to the blade would give the same effect since the object is merely to create relative movement as between the blade and the lands to prevent wearing teeth in the edge.

The thin dough-sheet deflected from the grooved roll is taken on a conveyor belt 35, driven at the surface speed of the roll, and is carried thereon to a point 36 where it is discharged toward a receiving surface 37.

At this point the thin sheet is subjected to a forming operation of a kind suited to the particular cereal product to be manufactured, and which in the case taken for illustration consists in folding the sheet back and forth on itself, as it is deposited on the receiving surface 37, thus producing on the latter a zigzag-folded sheet 38 ready for the next operation.

The mechanism for this purpose is shown as comprising a transverse bunter bar 39 carried on the ends of two slide rods 40 which slide in sleeve bearings 41 and are reciprocated therein by a cross head 42 to which their other ends are rigidly fastened. The cross-head is operated from an adjustable crank 43 on a crank shaft 44 by means of a connecting rod 45 connected to the center of the cross head by a ring-type joint 46, and so that bunter 39 is reciprocated back and forth across the path of the descending dough-sheet engaging it at somewhat of a downward angle and in such speed relation to it as to effect the desired overlap of the folds on the receiving surface. The action of this folding mechanism is to wave the moving sheet back and forth, thus producing folds according to the stroke and frequency of oscillation and the speed of the receiving surface 37 which may be a second conveyor belt and is shown as such.

The sleeve bearings 41 are mounted on the frame to rock on the axis indicated at 47 and can be thereby adjusted, in any suitable way, to control the path of the folding mechanism, and locked in adjusted position, as by means of pins such as indicated at 48.

Under some conditions it is desirable to modify or change the motion of the folding mechanism so as to make the path of the bar 39 more closely conform to the sheet movement than can be done with a straight motion or by changing the angle of the sleeve bearings, and in such case, shown in Fig. 6, the sleeve bearings are unpinned so that they are then free to rock on axis 47, and the ring joint 46 between the connecting rod and the cross-head is locked and made rigid by means of a pin 49 thus making the connecting rod, cross-head and side rods into a rigid structure slidingly and pivotally supported on the axis 47 and on the crank pin. The detail of the connecting-rod joint 46 with its holes 49ª to receive the locking pin 49 is shown in Fig. 9. In the result, the bunter is caused to follow a curved or elliptical course, as indicated by the dots in Fig. 6, descending with the sheet while in contact with it, and thus reducing to a minimum the possibility that it will tear or injure the dough sheet. It is to be noted that the longitudinal ribs impressed on the dough sheet by the grooved roll function in the nature of reinforcement to the sheet, which otherwise might be too thin and fragile to be handled with any degree of rapidity by the means described and it may be stated also that the precise path of the bunter bar is determined by the throw of the crank, which is adjustable, and by the location of the axis 47 of the sleeve-bearings, which can also be changed, and that by appropriately organizing and relating these factors it can be made to given longer and gentler contacts with the sheet and various kinds of folding effects.

As shown more clearly in Fig. 10, the bunter is merely a flat bar or plate with a rounded front edge clamped by its gudgeons in sockets 52 which latter are vertically adjustable on the posts 53 carried on the ends of the reciprocating slide rods, so that the elevation of the bar above the receiving conveyor 37 can be made as desired.

The conveyor 35 as shown is trained over the take-up rollers 50, adjustable by the means marked 51, and over other rollers, so that it has a generally arched or convex form, permitting the return stretch to be well above the folding system and thus giving easy access to the latter for cleaning purposes, but this conveyor can be otherwise organized so long as it satisfactorily serves to carry the thin sheet to the folder.

The product sheet on the receiving conveyor 37, however folded or laid thereon, is intended to be cut into biscuit or wafer form, or otherwise fabricated, and then baked to form a wholewheat cereal or mixed dough product, though as above indicated neither the form of the final product nor the composition of the dough material constitutes any limitation on the means of producing and manipulating the thin sheet according to the principle which has been above described. Nor is any limitation intended to the conjoint use of the sheet-making mechanism described with the folding mechanism described, or with any folding mechanism, nor to any of the details herein shown, except as these combinations and details may be defined by the claims which follow.

I claim:

1. In apparatus for making thin dough-sheets, the combination of two rolls, one being circumferentially grooved and together producing a thin, longitudinally ribbed dough-sheet, and a straight-edged blade engaging only the lands on said grooved roll for separating the dough sheet therefrom.

2. In apparatus for making thin dough-sheets, the combination of two rolls coacting to produce a thin, longitudinally ribbed dough-sheet, one of the rolls being circumferentially grooved, and a straight-edged deflector blade engaging only the lands on said grooved roll, said blade and lands having relative movement with respect to each other lengthwise of the blade.

3. In apparatus as described in claim 2, the specific means of creating the relative movement referred to which consists in circumferential roll grooves or lands the direction of which is oblique to the blade edge.

4. In apparatus as described in claim 2, the specific means for creating the relative movement referred to which comprises a carriage for the deflector blade and means for reciprocating the carriage and blade transversely of the roll grooves.

5. In apparatus for making thin dough-sheet, a pair of dough-sheet rolls, one being circumferentially grooved, a deflector blade engaging the grooved roll, a blade support which is coextensive with the roll axis and spring means on said support urging the blade to the roll.

6. In apparatus for making thin dough-sheet, two rolls, one being circumferentially grooved, a blade carriage reciprocated parallel to said roll, a deflector blade on the carriage and spring means between the carriage and blade for pressing the latter upon the roll.

7. In apparatus for roll-extruding thin dough-sheet, a deflector blade and a mounting therefor comprising a spring-yielding fulcrum on which the blade is supported as a lever, and means for clamping the blade on said fulcrum with its blade edge engaged to the roll surface.

8. In apparatus of the character described, the combination of a dough-sheet roll, a carriage adjacent the roll including two shafts parallel thereto supported on the machine framing, a deflector blade movably mounted on said carriage, and spring means urging it against the roll.

9. In a machine of the character described, the combination of a dough-sheet roll, and a blade carriage adjacent thereto, said carriage being provided with means for adjusting the blade in its own plane toward and from the roll and with other means for pressing it laterally against the roll.

10. In apparatus of the character described, the combination of a dough-sheet roll, a deflector blade therefor clamped in a blade-holder, a carriage for the blade holder fixed in relation to the roll axis, a yielding support on the carriage serving as a fulcrum for the holder and means for exerting pressure on said holder to force the blade therein against the roll.

KENNETH D. LOOSE.